US006042086A

United States Patent [19]

Roberts

[11] Patent Number: 6,042,086

[45] Date of Patent: Mar. 28, 2000

[54] MULTI-SPEED WINCH HAVING EPICYCLIC GEAR DRIVE

[75] Inventor: David Roberts, Nr Southampton, United Kingdom

[73] Assignee: Lewmar Marine Limited, Havant, United Kingdom

[21] Appl. No.: 08/934,997

[22] Filed: Sep. 22, 1997

[30] Foreign Application Priority Data

Sep. 30, 1996 [GB] United Kingdom .................. 9620313

[51] Int. Cl.[7] .................................................. B66D 1/14

[52] U.S. Cl. .......................... 254/344; 254/342; 475/296

[58] Field of Search .................................... 254/342, 344, 254/371; 475/294, 296, 297

[56] References Cited

U.S. PATENT DOCUMENTS

| | | | |
|---|---|---|---|
| 1,479,292 | 1/1924 | Farley | 475/296 |
| 2,441,989 | 5/1948 | Brown | 475/296 |
| 3,433,097 | 3/1969 | Fox | 475/294 |
| 3,682,442 | 8/1972 | Baldwin . | |
| 3,797,325 | 3/1974 | Christison | 475/296 X |
| 3,927,580 | 12/1975 | Fawcett | 254/344 X |
| 3,934,493 | 1/1976 | Hillyer | 475/297 |
| 4,003,274 | 1/1977 | Hirtsiefer | 475/296 |
| 4,227,680 | 10/1980 | Hrescak . | |
| 4,533,119 | 8/1985 | Liverance et al. | 254/344 |
| 4,725,043 | 2/1988 | Atfield et al. . | |
| 5,368,279 | 11/1994 | Ottemann et al. | 254/342 |
| 5,370,366 | 12/1994 | Ottemann | 254/344 X |

FOREIGN PATENT DOCUMENTS

| | | | |
|---|---|---|---|
| 405065946 | 3/1993 | Japan | 475/297 |
| 2 001 596 | 2/1979 | United Kingdom . | |
| 1550175 | 8/1979 | United Kingdom | 254/371 |
| 2 253 199 | 5/1991 | United Kingdom . | |
| 82/00133 | 1/1982 | WIPO . | |
| WO 8806565 | 9/1988 | WIPO | 254/344 |

*Primary Examiner*—Donald P. Walsh
*Assistant Examiner*—Emmanuel M. Marcelo
*Attorney, Agent, or Firm*—St. Onge Steward Johnston & Reens LLC

[57] ABSTRACT

A winch having one orbital gear or one set of orbital gears to transmit drive from a drive shaft to a drum in which the orbital gear or a gear of the set of orbital gears transmits drive to the drum at different drive ratios from the drive shaft in accordance with the direction of rotation of the drive shaft. The orbital gear or set of orbital gears is/are double gears engaged with a stationary gear ring and a drivable gear ring. Transmission of drive is either from a carrier of the gear(s) or from the drivable gear ring depending on the direction of rotation of the drive shaft.

9 Claims, 2 Drawing Sheets

MULTI-SPEED WINCH HAVING EPICYCLIC GEAR DRIVE

FIELD OF THE INVENTION

This invention relates to winches for yachts and other marine craft. It employs an epicyclic gear.

BACKGROUND OF THE INVENTION

Epicyclic gears have been used in winches before—see for example U.S. Pat. No. 3,682,442 and GB-A-2253199 (WO-A-9106502).

The first of these provides an epicyclic gear in which the axes of rotation of planet gears are borne on a rotatable carrier which intervenes between the central drive shaft and the winch drum which is to be driven. Oppositely-directed sprag clutches between the drive shaft and the carrier enable either 1:1 direct drive to be transmitted through the planetary gearing, the carrier of which is effectively locked stationary by the sprag clutches in one direction of rotation of the shaft, or with a moderate reduction, 1:4 being mentioned, through mutual relative rotation of all of the shaft, the carrier and the drum.

The second is concerned with the provision of multiple gear trains capable of giving extremely high reductions, provided in a detachable gearbox mounted at the head of the winch.

SUMMARY OF THE INVENTION

The present application starts from U.S. Pat. No. 368442 but utilizes an epicyclic gearing in an entirely different manner. The epicylic gearing is arranged in such a way that a single planetary gear or single set of planetary gears transmits drive at different drive ratios from a drive shaft to the drum of the winch in accordance with the direction in which the drive shaft is rotated. Usually these drive ratios are communicated to the drum through a final idler gear. This allows the very high reductions available from the use of epicyclics to be provided in a compact winch, especially one which is vertically compact, and wherein the final drive to the drum can be positioned towards the middle of the height of the drum, where good bearing support is possible. High load to winch weight ratios may be achieved because, in particular, higher loads can be transmitted through smaller gears.

The winch may be a two-speed winch in which both of the drive ratios are due to the epicyclic gearing; or it may be a three or more speed winch in which one or more other drive ratios, usually lower drive ratios (i.e. drives of lower mechanical advantage) are transmitted through other linkages to the drum. These or some of these other linkages may however include the common idler gear which is the final transmission for the drive ratios due to the epicyclic gearing.

The features of this invention may be combined with any of the features which are the subject of our co-pending applications GB 9623949.6, GB 9623948.8 and GB 9620314.6.

DESCRIPTION OF PREFERRED EMBODIMENTS

Figure 1B:
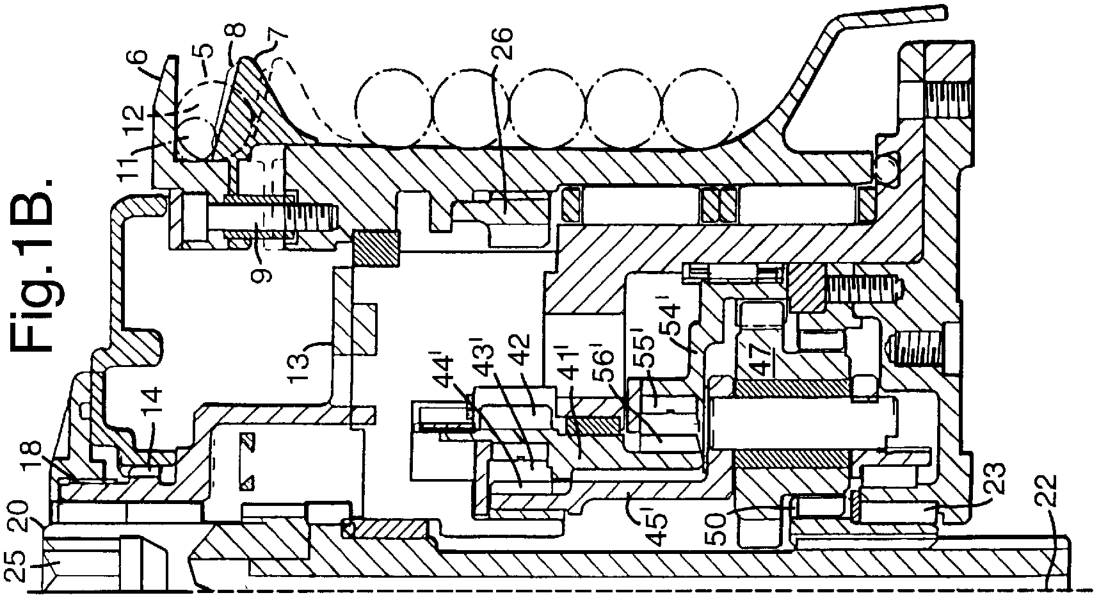
FIG. 1 is a radial section through two embodiments, the radial section to the left of the centre line of the drawing being of a first embodiment and that to the right of the centre line being of a second embodiment.
Figure 1A:
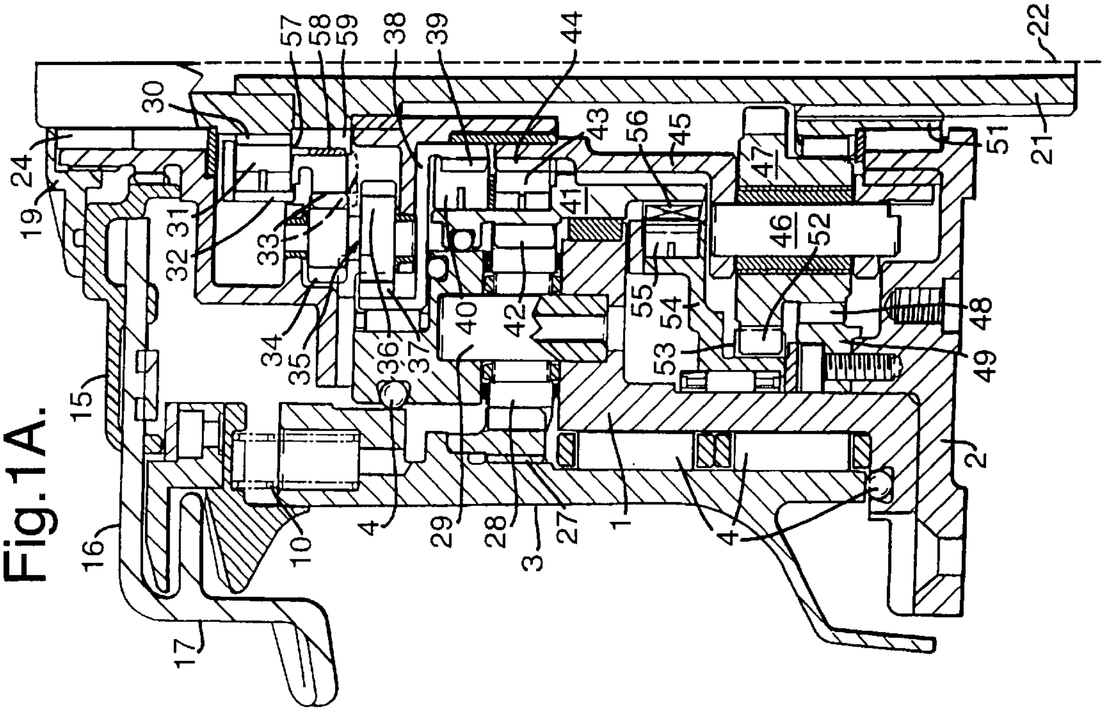

Referring to FIG. 1 and dealing first with the common parts, a winch has a stationary frame 1 with a base 2.

A drum 3 is rotatably mounted on the frame by bearings 4. At the head of the drum is a self-tailing channel 5 defined by jaws 6 and 7, one or more of which may have rope-engaging teeth such as 8 seen on the lower jaw 7. Lower jaw 7 is provided by an annular rib axially slidably mounted on posts 9 so as to be constrained to rotate at all times with the drum but to be axially displaceable, but being urged upwardly by springs 10. The displacement of the lower jaw 7 allows the self-tailing channel to accommodate a wide range of diameters of line, as indicated at 11,12.

An upper part 13 of the frame has towards its upmost end a sleeve bearing a first set 14 of splines which are for the rotational retention of an end cap 15 of the winch, under which is secured a stem 16 of a feeder and stripper arm 17 which is for feeding line into and stripping line out of the self-tailing channel 5.

Screw-threading 18 on the upper part 13 receives a top cover 19. Through an aperture in this cover there projects the end 20 of a drive shaft 21 which is rotatable about its axis of rotation 22 which serves as the centre line of this drawing, a first embodiment being sectioned to the left of that centre line and a second to the right.

There are bearings 23 at the base and 24 at the top of the main shaft for supporting it in rotation, as well as an internally keyed recess 25 in its head for the reception of the key of a drive handle. Alternatively of course the shaft 21 may be driven from below the winch.

There is a gear ring 26 inside the drum 3 at about halfway up its height, the ring 26 being engaged with the drum through thread 27, and there is an output idler gear 28 permanently enmeshed with the gear ring 26 and borne for rotation on a stationary shaft 29 which is supported in the frame 1.

In the first embodiment, seen to the left of the centre line of the drawing, we have a three speed winch.

A ratchet track 30 on the shaft 21 is engageable with pawls 31 borne on a ring 32, the lower portion of which has outwardly directed gear teeth 33. These engage gear 34 of a double gear 35, the other part 36 of which engages inwardly directed gear ring teeth 37 on an intermediate dished transfer member 38.

This is rotatably borne in the frame and at its smaller-diameter portion has a flange bearing a ratchet track 39 engageable with pawls 40 borne on an output sleeve 41. This has an outwardly directed gear ring 42 permanently enmeshed with the output idler gear 28.

The sleeve 41 bears a second set of pawls 43, adjacent to pawls 40, which engage with a ratchet track 44 on a carrier sleeve 45 on a lower flanged part of which is borne a non-rotating axle 46 about which is rotatable a planetary double gear 47 which orbits about the axis 22 and rotates about its own axis at the centre line of axle 46. One gear 48 of the double gear 47 is engaged both with a stationary gear ring 49 on the base 2 of the frame and with a gear 50 borne on a sleeve 51 splined to the lower end of the shaft 21. Another, larger diameter, gear 52 of the double gear 47 engages with an internal gear ring 53 of a rotatable transmission cup 54 which at its upper end bears pawls 55 engageable with a ratchet track 56 at the lower end of the output sleeve 41.

The operation of this embodiment is as follows. If drive is applied clockwise to the shaft 21, ratchet track 30 engages pawl 31 and drives the ring 32 in rotation clockwise thus rotating the double gear 35 anti-clockwise about its stationary axis of rotation and likewise driving the transfer member 38 anti-clockwise, this drive being transmitted to the output sleeve 41 through ratchet track 39 and pawls 40 and hence via gear ring 42 to the idler 28, to rotate the drum 3 in a clockwise direction. By selection of the ratios between the gears 34 and 36, the ratio of that drive can be selected but it will characteristically be the lowest ratio, that is to say, of lowest mechanical advantage.

On reversal of rotation of the shaft 21 to be anti-clockwise, pawls 31 become disengaged. Drive is transmitted from the shaft 21 to the sleeve 51 and gear 50 and then to gear 48 of the double gear 47. The second drive ratio of this winch is afforded by virtue of the orbiting planetary motion of the gear 47 about the central axis 22 as the gear 48 of the double gear 47 rolls between gear 50 and stationary gear ring 49. This anti-clockwise orbiting of the gear 47 draws the carrier 45 in an anti-clockwise direction by virtue of the engagement with the carrier of the axle 46. Ratchet teeth 44 transmit drive in that anti-clockwise direction to pawls 43, hence to the output sleeve 41, gear ring 42 and through the output idler gear 28 to the drum 3, which once more rotates in a clockwise direction.

Of course, gear 47 was driven even upon the first clockwise rotation of the shaft 21, but by virtue of the arrangement of pawls 40, 43 and 55 was ineffective to transmit drive to the sleeve 41 since those pawls would click past their ratchet teeth.

In the third drive ratio, that of highest mechanical advantage, the direction of rotation of the shaft 21 is reversed once again. Double gear 47 is now rolled clockwise around the axis 22 but transmits by virtue of the difference between diameters of gears 48 and 52 an anti-clockwise rotation, at a very high reduction, to transmission cup 54 to drive the output sleeve 41 once again in the anti-clockwise direction via pawls 55 and ratchet track 56.

On that second reversal pawls and ratchets 30,31 do not reengage. This is because during the anti-clockwise rotation the pawls 31 clicking past the ratchet teeth go to a radius exceeding that of a chamfered corner 57 of a cylindrical surface 58 of a part 59. Under the influence of gravity the pawls 31 on their ring 32 fall to the position shown in dotted lines for gear 33. In that situation, the pawls are held free of engagement with the ratchet teeth 30 by virtue of the radius of that surface being greater than the greatest radius of the teeth. Means such as those to be described in a third embodiment are provided to allow the user to raise the ring 32 and hence re-set the pawls.

Ratchet tracks 39, 44 and 56 and respective pawls 40, 43 and 55 allow overrun of the drum, idler gear and output sleeve.

In a modification, a further gear ring analogous to ring 26 could be provided at an upper part of the drum for reception of drive from pawl and ratchet 30,31. Furthermore, it could be arranged at the head portion of the winch a direct one to one drive from the shaft to the drum.

In the second embodiment, seen in the right-hand half of FIG. 1, only two speeds are provided, both via the epicyclic gearing. As before, double gear 47 engages with gears 50 on the sleeve 51 of the shaft and upon clockwise rotation of the main shaft drives a carrier 45' in an anti-clockwise direction. Upon anti-clockwise rotation of the shaft 21 a modified transmission dish 54' is driven anti-clockwise by teeth 52 of the double gear. This motion is transmitted via pawl 55' and ratchet 56' to a single ratchet track 44' engaged by pawls 43' from a modified output sleeve 41'. Drive to the idler gear 28 and hence to the drum is from teeth 42 of the output sleeve as before. Due to the opposite setting of pawls and ratchets 55',56' on the one hand and 43',44' on the other, the appropriate mode of drive is automatically selected upon appropriate direction of rotation of the main shaft 21.

Figure 2:
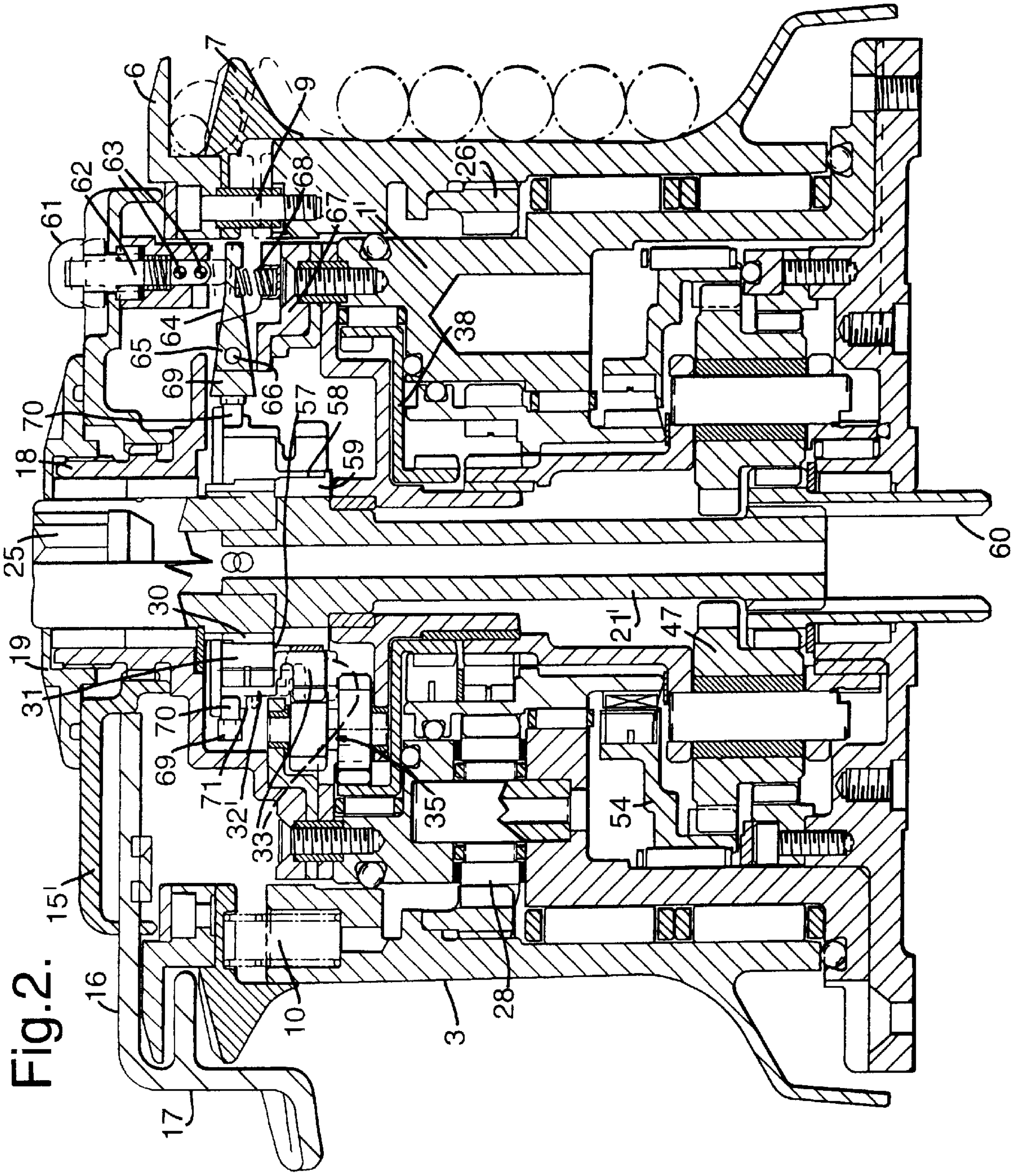
FIG. 2 is a section on two radii of a third embodiment.

A third embodiment, shown in FIG. 2, is closely related to the first but illustrates a particular way in which the first drive ratio pawls 30 may be re-set from their non-engaged position or may be held permanently available for engagement (so that reversals of the direction of drive will engage only first and second ratios alternately).

In this figure parts the same as in FIG. 1 are given like numbers and are not described again. This embodiment shows how the base of main shaft 21' may be adapted at 60 to receive drive from below the deck or other surface to which the winch is secured.

The control means for achieving the effects mentioned above has a mechanism similar to that seen in our GB-A-2001596.

It includes a control button 61 in the end cap 15'. A stem 62 below the button has pins 63 which can engage with a housing of the stem to maintain a lowered position of the button. The button is spring-loaded upwardly. In its lowered position shown in dot-dash lines the bottom end of the stem bears on and depresses an arm 64 of a lever 65 which is pivoted at 66 on a bracket 67 secured to the frame 1'. A spring 68 urges the arm 64 upwardly.

At the other side of the pivot 66 the lever forms a yoke 69 from which radially inwardly projecting studs 70 engage in an annular channel 71 formed on the outer surface of ring 32'. (The studs are positioned on a diameter which is parallel to the axis of the pivot 66, not as here shown.)

As explained above in relation to FIG. 1, during an anti-clockwise rotation the pawls 31 clicking past the ratchet teeth go to a radius exceeding that of a chamfered corner 57 of a cylindrical surface 58 of a part 59. Under the influence of gravity the pawls 31 on their ring 32' fall to the position shown in dotted lines for gear 33. In that situation, the pawls are held free of engagement with the ratchet teeth 30 by virtue of the radius of that surface 58 being greater than the greatest radius of the teeth. Gravity is assisted by the action of the spring 68. In that condition of the ring 32' the arm 64 is raised under the button to the inclined position shown in dotted lines.

To reset the pawls 31 the button 61 is depressed. The lever arm 64 is pushed downwardly to lift the yoke and hence the ring 32' and allow the noses of the pawls 31 to enter between ratchet teeth 30 so that they are held vertically by the horizontal top surface of the cylindrical part 59.

If it is wished to prevent the ring 32' from falling, the button 61 is depressed and turned. The pins 63 engage with the housing of the stem to maintain the depressed condition, in which lever arm 64 is also maintained depressed. This setting can only be escaped manually, by reversing the turn and allowing the button to rise.

I claim:

1. A winch comprising a drum, an axis of rotation of the drum, a direction of rotation of the drum, a drive shaft, an axis of rotation of the drive shaft, first and second directions of rotation of the drive shaft, a plurality of drive trains of different drive ratios between the drive shaft and drum to rotate said drum in said direction of rotation, one set of orbital gears, an axis about which the orbital gears orbit in a circular orbital path, axes of rotation of the orbital gears and first and second directions of rotation of the orbital gears about their axes of rotation, wherein the orbital gears are for transmitting drive from the drive shaft to the drum as two of the plurality of drive trains in dependence on the selection of the first and second directions of rotation of the drive shaft.

2. A winch according to claim 1, further comprising a stationary gear ring, a drivable gear ring and a carrier of the orbital gears and in which the orbital gears are double gears of which the gear tracks are respectively of different diameters, wherein the stationary and drivable gear rings are engaged with respective gear tracks of the orbital gears, transmission of the drive being from the carrier or the drivable gear ring according to the selection of direction of rotation of the drive shaft.

3. A winch according to claim 2, which is a two-speed winch, wherein the only two speeds are those of the different drive ratios respectively.

4. A winch according to claim 1 further comprising an additional drive train.

5. A winch according to claim 4 further comprising a common output gear, wherein the plurality of different drive trains and the additional drive train all engage the output gear, and a final idler gearing engaging the common output gear for transmitting to it drive from the plurality of different drive trains and the additional drive train.

6. A winch according to claim 5 further comprising a gear track on the inside of the drum at an intermediate part of the axial height of the drum.

7. A winch according to claim 6 wherein the gear track is engaged to the drum by a screw-thread.

8. A winch comprising a drum, an axis of rotation of the drum, a direction of rotation of the drum about its axis of rotation, a drive shaft, an axis of rotation of the drive shaft, first and second directions of rotation of the drive shaft about its axis of rotation, a plurality of drive trains of different drive ratios between the drive shaft and drum to rotate said drum in said direction of rotation, an orbital gear, an axis about which the orbital gear orbits in a circular orbital path, an axis of rotation of the orbital gear and first and second directions of rotation of the orbital gear about its axis of rotation, wherein the orbital gear is for transmitting drive from the drive shaft to the drum as either of the plurality of drive trains in dependence on the selection of one of the first and second directions of rotation of the drive shaft.

9. A winch comprising a drum, an axis of rotation of the drum, a direction of rotation of the drum about its axis of rotation, a drive shaft, an axis of rotation of the drive shaft, first and second directions of rotation of the drive shaft about its axis of rotation, a plurality of drive trains of different drive ratios between the drive shaft and drum to rotate said drum in said direction of rotation, an orbital gear, an axis about which the orbital gear orbits in a circular orbital path, an axis of rotation of the orbital gear and first and second directions of rotation of the orbital gear about its axis of rotation, two gear tracks on the orbital gear, the gear tracks being of respectively different diameters, a stationary ring gear, a rotatable ring gear, the ring gears being respectively engaged with the gear tracks, and a carrier for the orbital gear, whereby drive is transmitted from the drive shaft to the drum via the carrier or via the rotatable ring gear comprising respective ones of the plurality of drive trains in dependence on the selection of one of the first and second directions of rotation of the drive shaft.

* * * * *